United States Patent

[11] 3,631,737

| [72] | Inventor | Frederic E. Wells<br>Huntsville, Ala. |
|---|---|---|
| [21] | Appl. No. | 73,283 |
| [22] | Filed | Sept. 18, 1970 |
| [45] | Patented | Jan. 4, 1972 |
| [73] | Assignee | The United States of America as represented by the Administrator of the National Aeronautics and Space Administration |

[54] REMOTE CONTROL MANIPULATOR FOR ZERO GRAVITY ENVIRONMENT
8 Claims, 3 Drawing Figs.

[52] U.S. Cl. .................................................. 74/469,
 214/1 CM
[51] Int. Cl. .................................................. G05g 1/00
[50] Field of Search ........................................... 74/469,
 491, 501; 214/1 CM

[56] References Cited
UNITED STATES PATENTS
3,335,620  8/1967  Vertut ........................ 74/501

*Primary Examiner*—Milton Kaufman
*Attorneys*—L. D. Wofford, Jr., W. H. Riggins and John R. Manning ABSTRACT: A manipulator for handling objects remotely in a zero gravity environment comprising a plurality of rigid tubular sections joined end-to-end by flexible joints to form an articulated arm based at one end and free at the other end. Each of the rigid sections is manipulated by slender control cables attached to the respective sections and selectively extended and retracted. The cables are guided along the length of the articulated arm by means including the tubular sections, apertured disks at the flexible joints, and apertured lateral projections at the ends of the tubular sections. The free end of the articulated arm is provided with means, such as a grapple or an electromagnet, for holding an object being handled.

PATENTED JAN 4 1972

INVENTOR
FREDERIC E. WELLS

BY Wayland H. Riggins
ATTORNEY

INVENTOR
FREDERIC E. WELLS 3,631,737

REMOTE CONTROL MANIPULATOR FOR ZERO GRAVITY ENVIRONMENT

ORIGIN OF THE INVENTION

The invention described herein was made by an employee of the United States Government and may be manufactured and used by or for the Government for governmental purposes without the payment of any royalties thereon or therefore.

BACKGROUND OF THE INVENTION

This invention relates generally to mechanical handling devices and more particularly to an articulated arm for handling objects remotely in a zero gravity environment.

A variety of tools, machines and equipment particularly adapted for use in zero gravity environment will be required for the accomplishment of tasks to be performed during various long duration earth-orbiting space flights programmed for the future. Earth-orbiting workshops, laboratories and space stations will remain in earth orbit for long periods making observations and performing many tests and experiments. In carrying out these operations and other operations relating to maintenance, repair and day-to-day living aboard the space facility, much time and effort will be devoted to the movement from place to place of personnel, supplies and equipment during activities both inside and outside of the space facility.

Since the force of gravity is not available in an orbiting vehicle to permit walking on a floor or to urge objects toward a supporting surface, the movement from place to place of personnel and objects is cumbersome and time consuming. To minimize these problems a reliable, simple and lightweight device is needed to handle objects by remote control so that "spacewalking" is not always required for transferring people and things from place to place.

SUMMARY OF THE INVENTION

The invention comprises a manipulator device for handling objects remotely in a zero gravity environment and comprises a plurality of elongated, relatively rigid sections joined end-to-end by flexible joints. The series of joined sections are supported at one end and the opposite ends is freely moving. Manipulation of the sections is effected by shortening and lengthening control cables that are attached to the respective sections. The cables are actuated from the supported end of the sections and extend from the supported end to the respective sections to which the cables are attached. The cables are positioned and guided both inside and outside of the tubular sections and at the joints between the sections. The free end of the joined sections is provided with means for holding an object being handled by the device.

Accordingly, it is a general object of the present invention to provide a manipulator device for handling objects remotely in a zero gravity environment.

A more specific object of the invention is to provide a simple, reliable and lightweight device for moving people and things from place to place in the zero gravity environment of an orbiting space facility.

Another object of the invention is to provide a remotely controlled mechanical means for handling objects in the zero gravity environment of space that will reduce the time and effort required for handling personnel, supplies and equipment.

Another object of the invention is to provide an articulated arm operable in a zero gravity environment by remote control to move objects from place to place.

These and other objects and advantages of the invention will become apparent upon reference to the following specification, attendant claims and drawing.

DESCRIPTION OF THE PREFERRED EMBODIMENT

Figure 1:
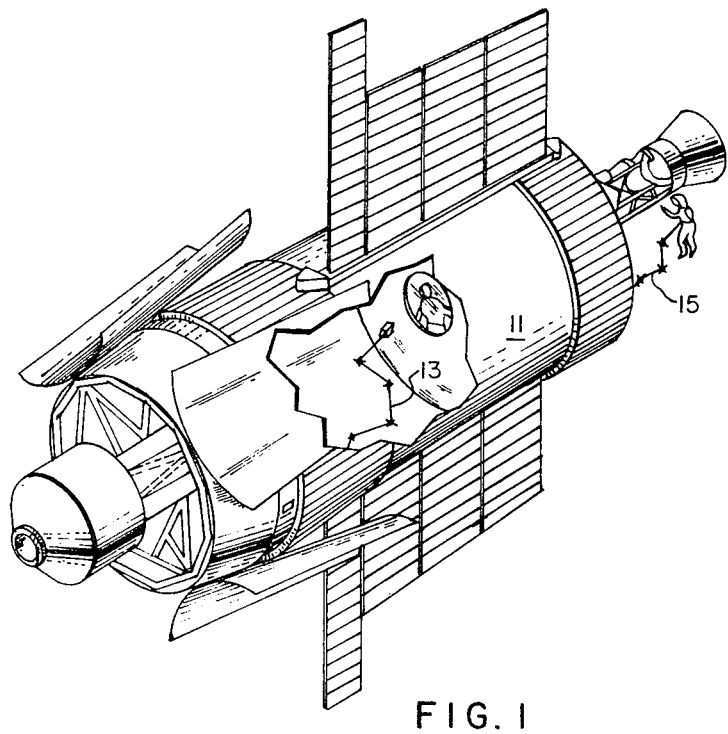
FIG. 1 is a perspective view, partially broken away, of a spacecraft equipped with manipulator devices according to the invention.

Referring to FIG. 1, therein is shown a space vehicle 11 equipped with remote controlled manipulators 13 and 15 embodying the present invention. The manipulator 13 is installed for handling objects inside the space vehicle and the manipulator 15 is arranged for moving and positioning personnel, equipment, and other objects outside of the space vehicle. As indicated previously, the manipulators, such as 13 or 15, may be used in carrying out operations relating to maintenance, repair and day-to-day living during activity inside and outside of the space vehicle.

Figure 3:
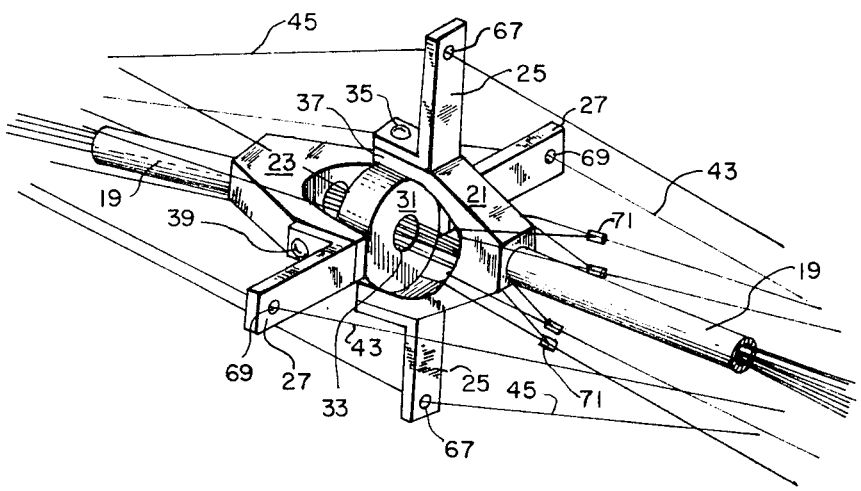
FIG. 3 is an enlarged perspective view of a typical flexible joint between the ends of the two sections of the manipulator device of FIG. 2.
Figure 2:
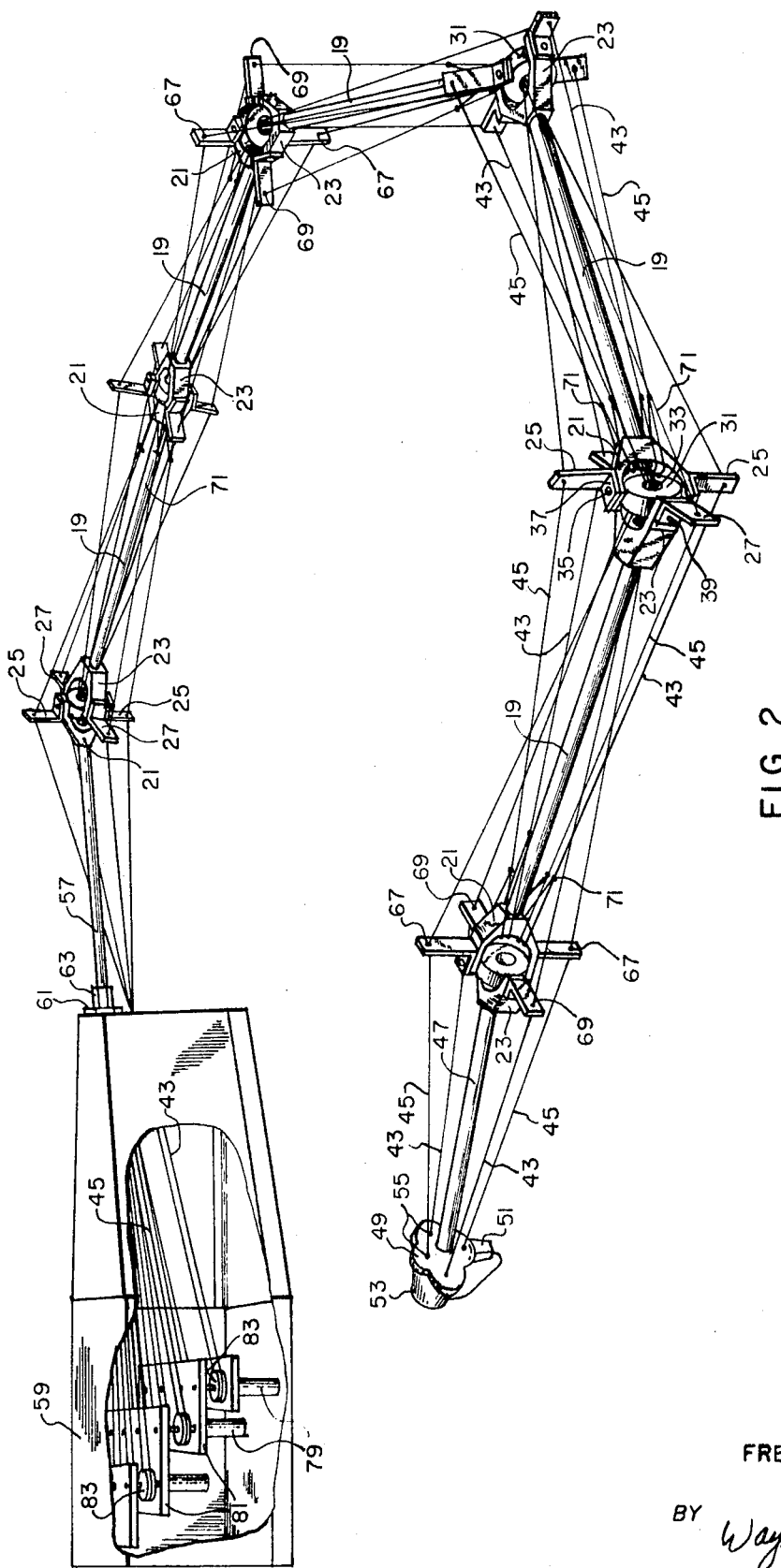
FIG. 2 is a closeup perspective view, partially broken away, of a manipulator device according to the invention.

The details of the manipulator will be described with reference to FIGS. 2 and 3. The manipulator comprises a plurality of relatively rigid tubular sections 19 joined end-to-end by flexible joints to form an articulated arm being based at one end and free at the other end. Each of the tubular sections 19 is provided with end connectors 21 and 23 which are similar in that both are basically U-shaped. The connectors 21 have projecting ears 25 on opposite sides of the connectors and the connectors 23 have similar laterally projecting ears 27. The connectors 21 and 23 are joined to the respective ends of the tubular sections with one connector rotated 90° relative to the opposite connector.

The opposite connectors 21 and 23 cooperate in the formation of a flexible joint between the tubular sections 19. Thus each of the connectors is pivotally jointed to a disk 31 having a central aperture 33 therethrough. The connector 21 is joined to the disk 31 by screws 35 extending through lug portions 37 extending beyond the laterally projecting ears 25. The connector 23 is jointed to the disk 31 by screws 39 extending through the main body of the connector 23. The connector 21 rotates in the horizontal plane and the connector 23 rotates in the vertical plane. The disk 31 turns or pivots with either connector about axes defined by the screws 35 and 39.

Manipulation of the tubular sections is effected through slender cables attached to the respective sections. The arrangement of the cables permits each of the sections 19 to be selectively pivoted in either of two perpendicular planes, for example, the vertical or horizontal plane. The cables that control movement of the sections in the horizontal plane are identified by the numeral 43 and the cables that control movement in the vertical plane are identified by the numeral 45. A horizontal control cable 43 and a vertical control cable 45 are attached to each of the tubular sections 19 and to an end section 47.

The end section 47 has a free end which carries a bracket 49 incorporating an electrical connection socket that receives a plug 51 for an electromagnet 53. Obviously, various other holding or containing means, such as a grapple, may be provided on the free end of the section 47 suitable for supporting personnel or particular items. The control cables 43 and 45 that control the end section 47 are attached to the bracket 49 at the end of the section 47, being threaded through holes 55 in the bracket.

At the fixed base end of the articulated arm formed by the sections 19 and 47 is a base tubular section 57 joined at one end to a cabinet 59 by coupling elements 61 and 63. The other end of the section 57 is joined to the first tubular section 19 in the same manner as the sections 19 are joined, using connectors 21 and 23 and a disk 31 as previously described.

The cables 43 and 45 attached to the respective tubular sections are disposed primarily within the sections as they extend along the length of the articulated arm from the base end toward the free end. The cables are guided through the joints between the sections by the disks 31, being threaded through the apertures 33 in the disks. However, the cables emerge from within the tubular sections prior to reaching the particular section to which they are attached. As shown in FIG. 2, the control cables 43 and 45 attached to any particular section extend through all of the preceding sections except the immediately preceding section. Prior to reaching the immediately preceding section, and after passing through the disk 31, the cables diverge from the section and pass, respectively, through apertures 67 and 69 in the laterally projecting ears 25 and 27. After passing through the ears 25 and 27 the cables converge toward the end of the particular tubular section they control and are attached by being looped around the connector 21 with the loops being secured by small clamps 71. It is noted that the cables that control the first tubular section 19 do not pass through the immediately preceding section 57 but pass directly out of the cabinet 59, through the ears 25 and 27, and then converge to the end of the first section 19 and are looped around the connector 21.

The respective control cables 43 and 45 are actuated by reversible electric motors 79 mounted in rows in the cabinet 59 and supported by transverse plates 81 that are connected at their ends to the cabinet 59. Each of the motors 79 turns a pulley 83 around which is wrapped one of the horizontal control cables 43 or one of the vertical control cables 45. Thus a motor 79 is provided for each of the control cables 43 and 45 and rotation of any particular pulley 83 will simultaneously wind up (shorten) one section of the cable wound on the pulley and unwind (lengthen) the companion section of the same cable. It is apparent that either of the rigid sections 19 or the end section 47 may be moved horizontally or vertically by rotation of the appropriate pulley 83. Switches for the respective motors 79 may be arranged on a control panel (not shown) for convenient control of the motors 79 and resultant control of the manipulation of the articulated arm. Also, the control system could be further refined by using a computer preprogrammed to control the motors 79 and direct the free end of the manipulator to a specific destination without requiring manual control.

Means other than the electric motors 79 and pulleys 83 may be used to shift the control cables 43 and 45. For example, the cables could be attached to hydraulic cylinders that would simultaneously retract one cable section and extend the companion cable section.

I claim:

1. A manipulator device for handling objects remotely in a zero gravity environment comprising:
   a. a plurality of successive relatively rigid tubular sections joined end-to-end by flexible joints;
   b. the first of said tubular sections being joined at one end to a base support and the last of said sections having a free end;
   c. a control cable attached to each of said tubular sections succeeding said first section;
   d. said control cables extending, respectively, between said tubular sections and said base support;
   e. said flexible joints joining said tubular sections comprising an apertured element disposed between the joined ends of said tubular sections;
   f. means pivotally connecting said joined tubular sections to said apertured elements;
   g. some of said control cables passing through said successive tubular sections and through said apertured elements between said successive sections whereby said sections and said apertured elements provide a guide for said cables;
   h. means for actuating said control cables whereby said sections may be manipulated in a selected direction.

2. The invention as defined in claim 1 wherein said means for pivotally connecting said tubular sections to said apertured elements comprises a substantially U-shaped connector attached to each of the opposed joined ends of said tubular sections, each of said connectors being pivotally connected to said apertured element between said joined ends, the connector on one of said sections being rotated 90° relative to the opposite connector.

3. The invention as defined in claim 2 wherein said apertured elements comprise a disk having the aperture in the center thereof, each of said connectors having an opening therethrough, some of said control cables passing through said openings in said connectors.

4. The invention as defined in claim 2 wherein each of said connectors has a pair of oppositely extending portions projecting laterally of said connectors, each of said portions having a hold therethrough, a control cable passing through each of said holes.

5. The invention as defined in claim 1 wherein said control cables each comprises two lengths disposed opposite each other on opposite sides of said respective tubular sections whereby one of said lengths may be retracted while the other of said lengths is extended to deflect said respective sections toward either of said opposite sides.

6. The invention as defined in claim 1 wherein said control cable attached to a particular tubular section passes through each of the preceding tubular sections except the tubular section immediately preceding said particular tubular section.

7. The invention as defined in claim 6 including a pair of projections attached to and extending laterally of each of said preceding tubular sections, each of said projections having a hole therethrough, said control cable attached to said particular tubular section passing through one of said holes.

8. The invention as defined in claim 7 wherein said cable attached to said particular tubular section diverges outwardly of said immediately preceding tubular section to one of said holes in said projections and converges inwardly toward said particular tubular section.

* * * * *